B. G. LAMME.
SPEED CONTROLLING SYSTEM FOR INDUCTION MOTORS.
APPLICATION FILED FEB. 19, 1914.
1,318,775.
Patented Oct. 14, 1919.
3 SHEETS—SHEET 1.
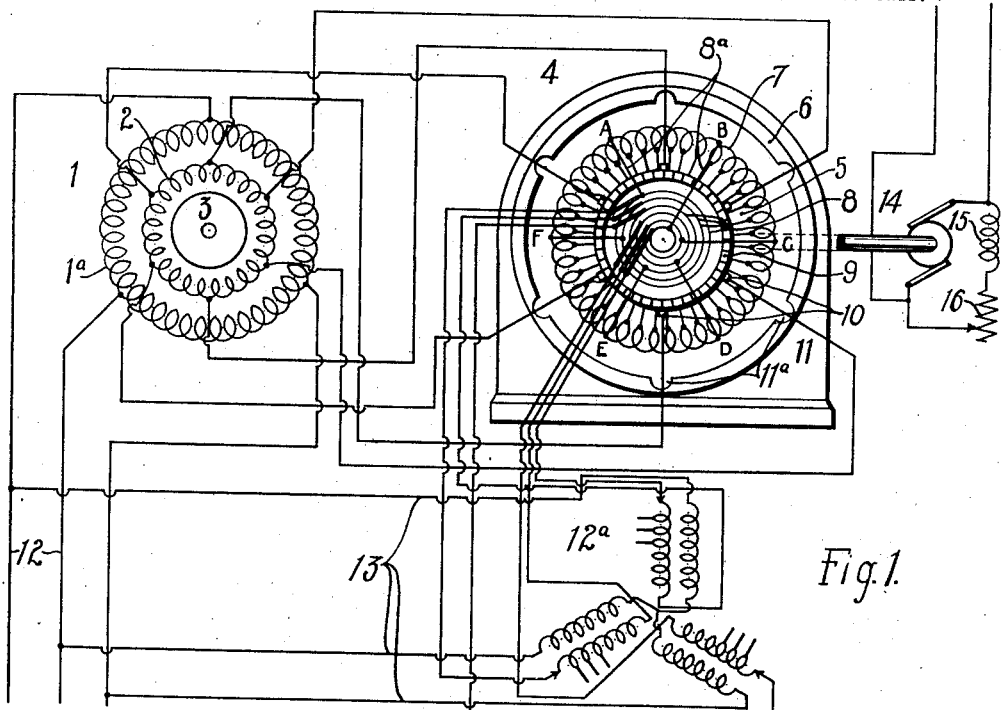
Fig. 1.
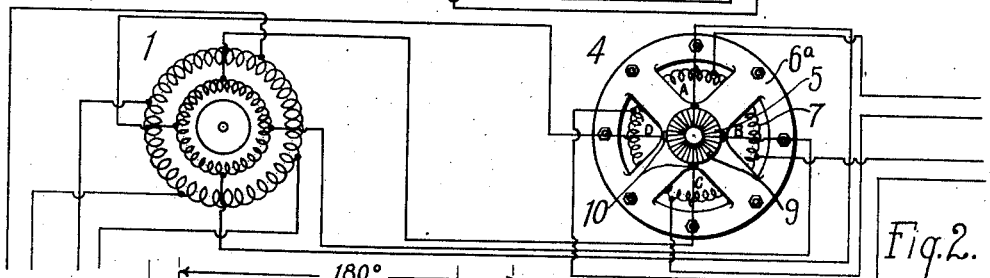
Fig. 2.
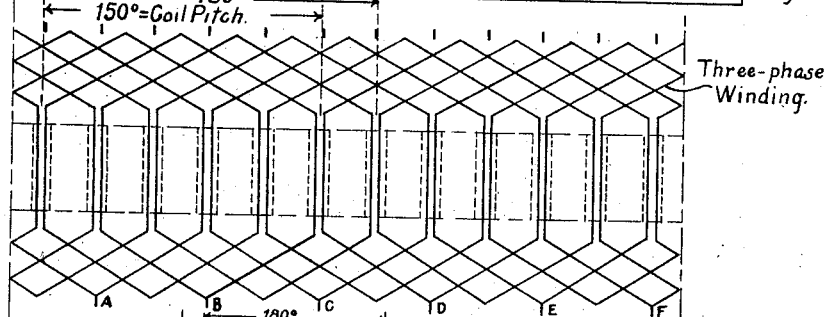
Fig. 3. Three-phase Winding.
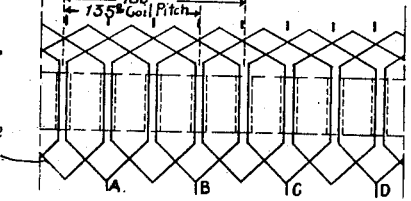
Fig. 4. Two-Phase Winding.
WITNESSES:
R. J. Fitzgerald
W. R. Coley
INVENTOR
Benjamin G. Lamme
BY
Urleigh G. Carr
ATTORNEY

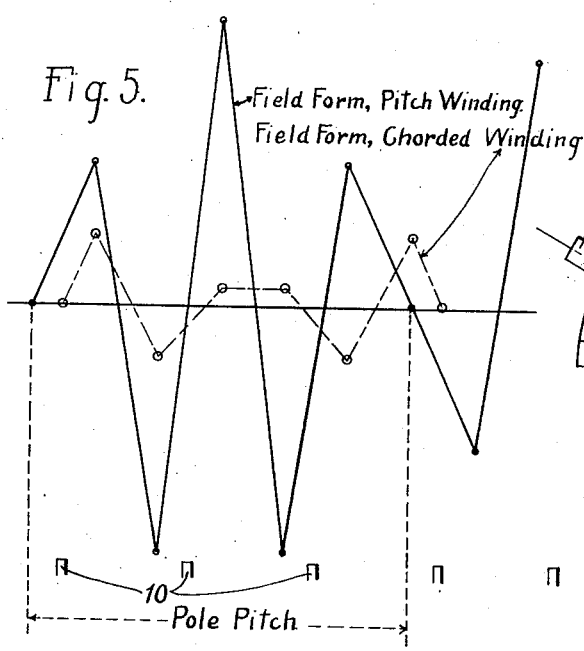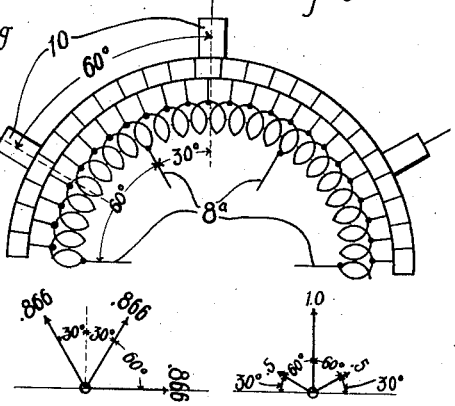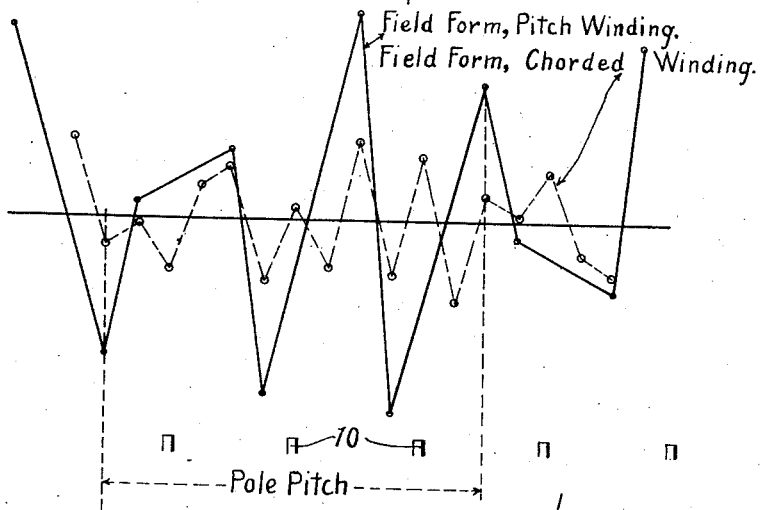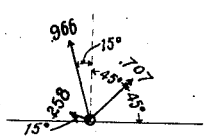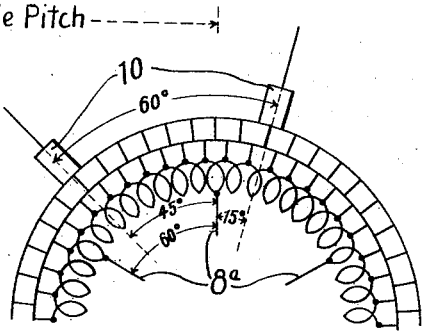

B. G. LAMME.
SPEED CONTROLLING SYSTEM FOR INDUCTION MOTORS.
APPLICATION FILED FEB. 19, 1914.
1,318,775.
Patented Oct. 14, 1919.
3 SHEETS—SHEET 3.
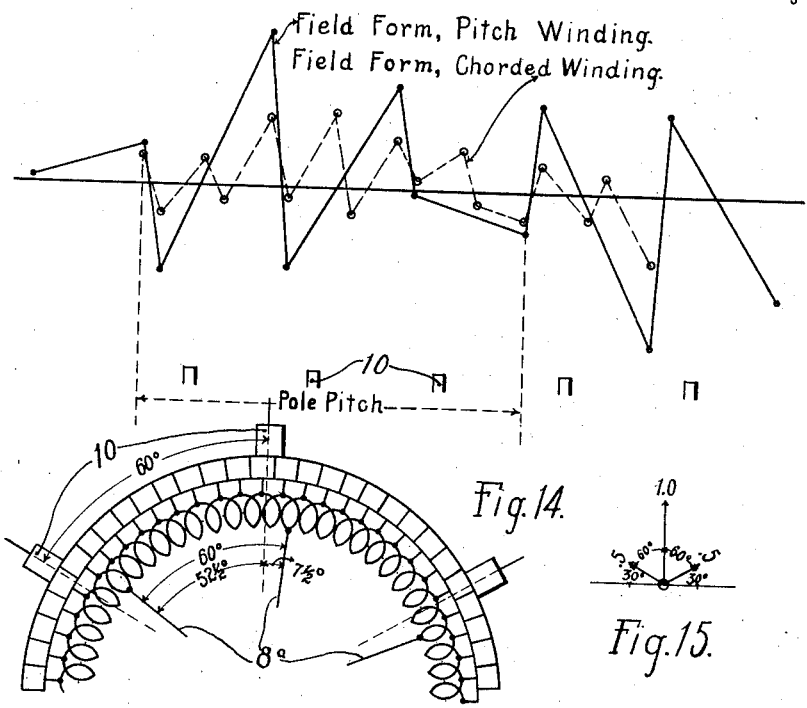
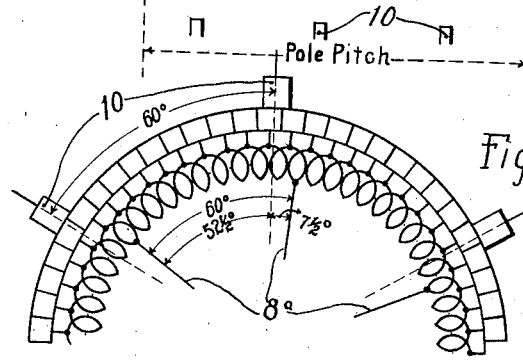
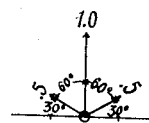
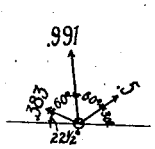
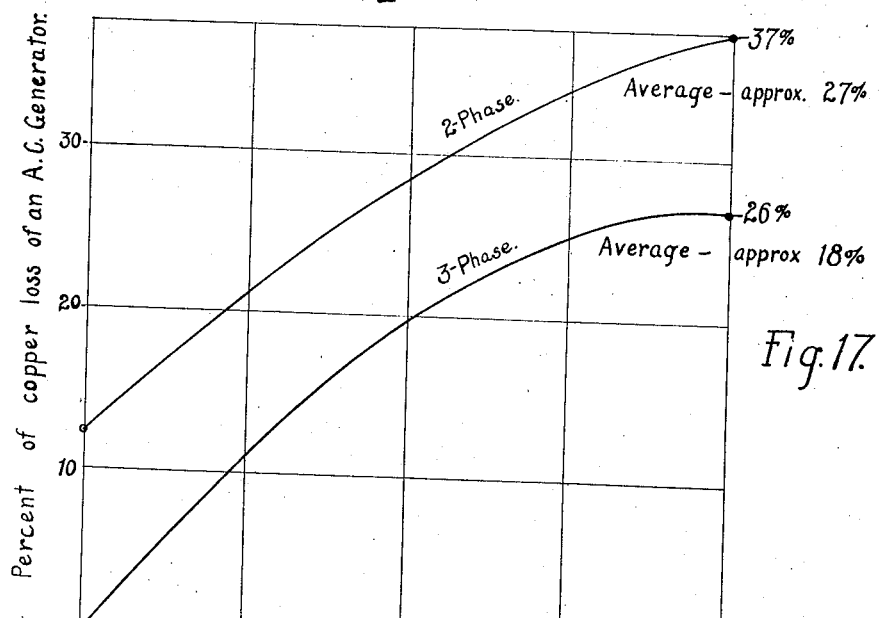
WITNESSES:
*G. J. Fitzgerald*
*W. R. Coley*
INVENTOR
*Benjamin G. Lamme*
BY
*Wesley G. Carr*
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

SPEED-CONTROLLING SYSTEM FOR INDUCTION-MOTORS.

1,318,775. Specification of Letters Patent. Patented Oct. 14, 1919.

Application filed February 19, 1914. Serial No. 819,717.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Speed-Controlling Systems for Induction-Motors, of which the following is a specification.

My invention relates to dynamo-electric machines and to systems of control associated therewith, and it has special reference to frequency-changing apparatus that is adapted to regulate the speed of induction motors and similar devices.

One object of my invention is to provide an apparatus of the above-indicated character which shall be reliable and particularly efficient in operation, and which shall permit of considerable flexibility of control.

Another object of my invention is to provide inexpensive, compact and relatively small and simple control apparatus for regulation of the speed of an induction motor or similar machine.

Another object of my invention is to provide a special type of winding for the above-mentioned frequency-changing apparatus, whereby the commutating conditions therein are materially improved.

In the prior art, various methods of controlling the speed of induction motors have been utilized. Among the best known are regulation by varying the resistance of the secondary winding, which scheme is open to various operating objections, including wastefulness and high maintenance cost, and control by concatenation, which involves more or less expensive apparatus and is not as efficient in operation as is often desired.

According to my present invention, I employ a special type of independently driven dynamo-electric machine in connection with the secondary winding of the induction motor to be controlled, whereby alternating currents of predetermined voltage and frequency are supplied to that winding in such manner that a desired motor speed may be maintained over a relatively wide range of load conditions. The machine I prefer to employ is similar, in its broad aspects, to those set forth in my U. S. Patent No. 682,942, granted September 17, 1901, and assigned to the Westinghouse Electric & Mfg. Company. This machine and its accessory apparatus, when employed in the present control system, may be compact and light and of small capacity relative to that of the motor to be controlled, and the machine proper has exceptionally small operating losses, as hereinafter explained.

Briefly, the machine in question, which may be termed a "frequency changer", comprises a rotatable winding of a special type, collector rings, a commutator and a stationary or rotatable laminated core or field-magnet without magnetizing-coils of any sort, the core, consequently, acting simply as a return path or keeper for the magnetic lines of force produced by the single armature winding. An alternating current supply system is connected through suitable voltage-varying transformers or their equivalent to the collector-rings, and the commutator brushes are connected preferably to the secondary or rotor winding of the induction motor by the "diametral-phase", or an equivalent connection, as hereinafter described. Any driving means having suitable variable-speed characteristics may be utilized for actuating the rotatable part of the frequency changer. In this way, the voltage and frequency of the secondary winding of the induction motor may be varied absolutely independently.

In the accompanying drawings, Figure 1 is a diagrammatic view of a control system that embodies my invention. Fig. 2 is a diagrammatic view of a modification of the system and of one machine shown in Fig. 1; Figs. 3 and 4 are complete winding diagrams of the rotor windings of the frequency changers shown in Figs. 1 and 2, respectively, and Figs. 5 to 17, inclusive, are curve sheets showing various operating characteristics of the machine under consideration.

Referring to the drawings, the system here shown comprises an induction motor 1 having a suitable primary winding 1ª, and a secondary winding 2 preferably disposed on the rotor 3, as is customary, and a frequency changer 4. It will be understood that the particular type of induction motor, other than that it is provided with a wound secondary member, is not material to my present invention, and, consequently, further description thereof is not deemed necessary.

The frequency changer 4, comprises an armature 5 and a field magnet-ring or keeper 6. The armature is provided with a special distributed winding 7 that is fed from a plurality of collector-rings 8 through taps 8ª having connection to suitably spaced points of the winding, the spacing being according to the number of phases for which the machine is designed. A commutator cylinder 9 has its segments suitably connected to the winding 7, and a plurality of current-collecting devices, such as brushes 10, the number of which corresponds to the number of phases of current, may be disposed at suitable intervals around the commutator cylinder 9. However, it will be understood that, by internally cross-connecting the armature winding of, for example, a parallel-wound multipolar machine, the brushes could be omitted from some of the positions. In other words, a machine of the type under consideration may have uniformly-spaced brush positions or zones, without necessarily requiring brushes in all of these positions.

The field-magnet ring or keeper 6, which is preferably constructed of laminated material, incloses the armature 5 and may be disposed within a frame 11, there being no field magnetizing coils. A plurality of slots 11ª may be provided to suitably weaken the flux in the commutating zones and improve commutation; however, as hereinafter described, such slots are not necessary with the special type of winding I employ.

The armature winding 7 is chorded, as hereinafter specified, and is provided with three points of current supply or connection per pole, in the case of a three-phase winding. Such a condition is fulfilled by a "diametral-phase" connection, that is a system wherein the external connections of one of the phase windings are reversed with respect to their regular rotative relation to the connections of the other phase windings, or by the well-known "double-delta" arrangement of windings. In general, if the machine is designed for $n$ phases, there are $n$ points of current supply per pole of the armature winding. In Fig. 1 a suitable set of three-phase connections, and in Fig. 2 a suitable set of two-phase connections, are illustrated.

By properly chording the coils, I have found that I am able to substantially neutralize, or compensate for, armature reaction at the points of commutation. As in an induction motor, so in the machine under consideration, a rotating magnet field is set up by the magnetizing current. In addition, in the case of an induction motor, the working currents in the stator winding may be assumed to create a heavy flux which, however, is substantially neutralized by the load current flux of the secondary winding. In the machine employed in carrying out my invention, however, the incoming and outgoing working currents will not exactly neutralize at all points if an ordinary armature winding is used. I have found that by chording the winding, that is, by making the coil span different from the machine pole pitch by an amount corresponding to substantially one-half the distance between adjacent brush positions, the two fields set up by the working currents substantially neutralize at the points selected for commutation and thereby produce good commutating conditions. For example, with a three-phase winding and two poles, that is, with 180° representing full pitch, the span of each coil should be substantially 150° or 210°, or with a two-phase winding, the span should be substantially 135° or 225°, the short-chord windings being shown in Figs. 3 and 4, respectively.

Stated as a general mathematical formula, each coil in a winding of the $n$ phase type, covers a span of 180 electrical degrees $\pm (\tfrac{1}{2}) \dfrac{(360°)}{2n}$ or 180 electrical degrees $\pm \dfrac{(90)}{n}$.

Figs. 5, 6 and 7 of the sheet of curves show graphically comparisons of some magnetic field forms of dynamo-electric machine embodying a full-pitch armature winding with some field forms produced by a machine comprising an armature winding constructed in accordance with my invention.

The curves of Fig. 5 represent the respective instantaneous conditions of armature reaction with the brushes 10 located midway between the taps 8ª (see Fig. 6) the various tap currents being taken in magnitude and direction as shown in Fig. 7, and the brush currents, consequently, being 30° displaced from the respective tap currents, as indicated in Fig. 8.

The curves of Figs. 9 and 13 represent the conditions with the relative tap and brush positions shown in Figs. 10 and 14, respectively. The relative magnitudes and directions of the several tap and brush currents are indicated in Figs. 11 and 12, and in Figs. 15 and 16, respectively.

As indicated in each of Figs. 5, 9 and 13, the field form of my frequency-changing machine is of smaller amplitude than the field forms of machines employing full-pitch armature windings. Moreover, the flux in the several commutating zones is, in many cases, close to zero, and at no commutating point is the flux present sufficiently great to preclude good commutating conditions. The advantages of such an arrangement, particularly in a machine of the type under consideration, will be readily appreciated.

In Fig. 1, the armature 5 and field magnet ring 6 are shown as relatively rotatable, and in Fig. 2, the armature 5 and a keeper 6ª are shown as adapted to rotate together.

Selection of the one or the other type is dependent upon the particular operating conditions to be met and the desires of the user.

An alternating current supply system 12 of the proper number of phases is connected to the collector rings 8 through suitable voltage-varying transformers 12ª by a plurality of supply conductors 13. Leads corresponding to the several phases of current connect the various brushes 10 to the different phase windings of any suitable type, of the secondary member 2 of the induction motor, the primary winding 1ª of which is connected to the supply system in any suitable manner. It will be noted that one set of opposing brushes in each of Figs. 1 and 2 with respect to the other sets in its connection with the induction rotor winding is such as to constitute the well-known diametral phase connection, and afford three points of current supply per pole of the winding.

Any driving means for the frequency changer having a suitable range of speed may be employed. I have shown a mechanically associated shunt motor 14 energized from a suitable supply circuit (not shown) and having a field winding 15 the current through which may be varied to change the motor speed by means of a variable resistor 16. It will be understood, however, that I do not restrict myself to the use of such an apparatus in this connection.

If desired, other devices doing useful work may be actuated from the frequency changer or from the shunt motor, whereby the energy transmitted to the frequency changer from the induction motor rotor may be utilized, the frequency changer itself absorbing only sufficient energy to overcome its losses. In this way, the control system under consideration may be very economically operated.

The operation of the foregoing apparatus may be described as follows: Assuming that the frequency changer winding is suitably energized from the supply system, if the winding alone is rotated at synchronous speed, the alternating armature-current generates a field fixed in space, the ring 6 serving merely as a keeper for the lines of force, as hereinbefore stated, and a current of substantially zero frequency is delivered from the commutator. A variation from synchronous speed causes a proportional change in the delivered frequency, which is also the frequency of flux variation in the keeper. If both the winding and the field magnet-ring rotate together, the frequency in the keeper will be the same as that in the armature core.

If the voltage supplied to the frequency changer is held constant and the speed is varied, the frequency obtained from the commutator is proportionately varied, always corresponding to the degree of departure from synchronous speed, but the voltage at the commutator end remains constant, or substantially proportional to that impressed upon the collector rings. As a result, it is possible to independently vary the voltage and frequency delivered to the secondary winding of the induction motor, the voltage being controlled by the regulating transformers and the frequency being controlled by the speed of the frequency changer.

When the induction motor is at approximately synchronous speed, the frequency in its secondary winding is very low and the voltage across the winding is substantially zero. Assuming, for instance, a slip of 2% which signifies a secondary frequency of 2% of that in the primary winding, the frequency changer is operated to produce from the commutator a frequency of 2% of the supply circuit frequency and a voltage of practically zero. That is, the frequency changer is run with no impressed voltage and at a speed corresponding to a 2% drop from synchronous speed, since the frequency delivered from the commutator varies in proportion to the departure from the speed of synchronism, as hereinbefore stated.

At 10% slip in the induction motor, part of the secondary voltage is employed in sending current through the secondary winding and the remainder must be compensated for by the frequency changer. The latter machine is therefore regulated to deliver 10% of the line frequency, that is, to run at 10% from synchronous speed; and at a voltage slightly less than the exact 10% voltage. Under these conditions, the induction motor may be operated at 10% below synchronous speed, without rheostatic loss and at practically constant speed for all loads, if desired.

At small slips in the induction motor, therefore, the frequency changer operates close to synchronous speed and at very low induction and iron losses. Thus, the frequency changer, when designed for a small range in speed, such as 25%, would not be worked at more than 25% of the induction required for full voltage, and, consequently, its magnetic structure may be very small and light. Moreover, by reason of the continuously varying relation between the currents delivered from the commutator and those supplied through the collector rings, the total copper loss is much lower than that in a simple generator of equal capacity, as will be appreciated from the well-known relatively small copper losses in the armatures of rotary converters, particularly in those having the special types of connections hereinbefore specified. I have found, however, that the losses in machines constructed in accordance with the present invention are even smaller than the losses in rotaries, for the following reasons:

In a rotary converter, which is a synchronous machine, the armature revolves at a constant speed which bears a fixed relation to the armature frequency and, consequently, every conductor of the armature bears a respectively constant-space relation to the various instantaneous field forms, that is, to the instantaneous values of total magnetic flux surrounding the armature, the frequency of the flux corresponding to the speed of the armature. Moreover, the machine delivers direct current from the commutator under all conditions and, therefore, for each value of delivered current, a corresponding substantially constant relation obtains between the direct and alternating currents in the armature and between their respective fluxes. As a result, the copper losses in the armature assume a minimum value which is predetermined by the number of phases of the machine. For instance, values given in various electrical handbooks for the "ratio of effective armature resistance to its true generator value" are as follows:

4 ring converter 0.37.
6 ring converter 0.26.

On the other hand, my frequency changer is not a synchronous machine, that is, its speed does not correspond to the constant armature frequency which is supplied by the transformers 12$^a$, since the speed is regulated by an outside source, as the shunt motor 14. Consequently, every conductor of the armature bears a considerably varying space relation to the various instantaneous values of total magnetic flux surrounding the armature, which flux, during operation, is often of a frequency not corresponding to the armature speed. Moreover, my frequency changer, as hereinbefore noted, delivers direct current, or current of zero frequency from the commutator, when driven at synchronous speed; but, when rotating at any other speed, the machine delivers alternating current of a frequency corresponding to the departure from synchronous speed. As a result, when the machine is driven at synchronous speed, the copper losses correspond to those of a rotary converter, but at any other speed these losses vary in cycles continually in accordance with the varying relations of the armature and delivered currents, and according to the respective positions of the alternating current taps 8$^a$ and the brushes 10, as shown in Fig. 17. The taps move with respect to the brushes 10 and occupy all possible angular positions relative thereto. When the two sets of terminals coincide in position on the armature winding, the current from one set can feed directly through the other set, with no conversion losses except those occasioned by the magnetizing current. When the members of one set of terminals are respectively located midway between the members of the other set, the maximum losses will occur. By reason of the above-mentioned cyclical variation of the copper losses, the average or effective copper losses in percentage of the true generator value figure out to be as follows:

4 ring converter 27%.
6 ring converter 18%.

the maximum losses in each case being equal to the constant losses of the corresponding rotary converters, as shown by the curves of Fig. 17.

It is, of course, true that the above-mentioned shifting relations between the winding taps and the brushes occur also in rotary converters, but as a constant direct current is delivered by the brushes, the copper losses do not follow a cycle such as that just discussed. This conclusion may be reached by a consideration of the following facts: since a constant current is delivered from the commutator brushes in a rotary converter, from Kirchoff's Laws it follows that a resultant current of equal value must flow in the windings adjacent to, and on both sides of each brush. The same total effective resistance and copper loss between any pair of brushes obtain, therefore, irrespective of the relative positions of the winding taps and the brushes, as will be readily seen by the use of a simple diagram. In my frequency-changer, however, the current delivered by the brushes, when the machine is not driven at synchronous speed, is alternating; and it may readily be conceived that a condition might arise where the armature and the delivered currents in some phase pass through their zero values simultaneously, thereby causing absolutely no copper loss in that particular circuit. At other times, the losses are dependent upon the relations of the alternating currents under consideration, as will be understood.

The above theoretical discussion is intended and believed to be adequate to set forth the chief operating features whereby my frequency-changer is distinguished from rotary converters and similar machines.

As in rotary converters, the copper losses in my frequency changers become relatively smaller with an increase in the number of phases for which the machine is designed. Therefore, the single winding of the frequency changer may be of relatively small construction, and the entire machine be very small and compact. Likewise, the regulating transformers may be of relatively small capacity, corresponding only to the speed range of the frequency changer rather than to the full capacity of the induction motor. Moreover, the machine may be operated at relatively high speed, and thus good ventilating conditions are readily obtainable.

It should be noted that, at synchronous speed, the frequency changer delivers zero frequency at the commutator and that it may deliver frequency in accordance with its departure from synchronous speed and of the opposite rotation of phases when above synchronism to that when below. Consequently, by proper disposition of the phase relations, the induction motor may be operated above synchronous speed, provided suitable means are employed for passing the motor through synchronous speed.

However, when running above synchronism, new commutating conditions are encountered. Whereas, when below synchronism, the resultant field or flux set up by the load currents is of such disposition as to make the commutation worse, so that the chording hereinbefore mentioned is beneficial. On the other hand, when above synchronism, the resultant field created by the load currents is of such disposition as to be of assistance in commutation. In the latter case, therefore, chording may not be so satisfactory and possibly even no chording at all would give better results.

It will be understood by those skilled in the art that other uses may be made of my invention than that hereinbefore specified. For instance, power-factor correction may be obtained, as a result of over-excitation of the secondary winding, by applying thereto a relatively high voltage for a given frequency.

I do not wish to be restricted to the specific circuit connections and structural details herein set forth, since modifications thereof may be made within the spirit and scope of my invention. While I have shown and described a winding having two poles, it will be understood that the invention is readily adaptable for employment in machine having four or any other suitable number of poles. Also, a frequency changer supplied from a circuit of a certain number of phases may be easily adapted to supply current of a different number of phases to the secondary winding of the induction motor. I desire, therefore, that only such limitations shall be imposed as are indicated in the appended claims.

I claim as my invention:

1. The combination with an induction motor having a primary winding and a secondary winding independent thereof, of an alternating current supply circuit, a second dynamo-electric machine comprising a rotatable armature winding fed from said supply circuit and having a commutator connected to said secondary winding for speed regulation and a field-magnet disposed around said armature winding, said armature winding being so chorded as to instantaneously compensate for all flux variations in the commutating zones, and means for varying the speed of said armature.

2. The combination with an induction motor having a primary winding and a secondary winding independent thereof, of an alternating current supply circuit, a second dynamo-electric machine comprising a rotatable winding fed from said supply-circuit and having a commutator connected to said secondary winding and a field-magnet without magnetizing coils associated with said armature winding, said armature winding being so chorded as to instantaneously compensate for all flux variations in the commutating zones, adjustable means for varying the voltage of said secondary winding through said second machine, and independent means for varying the speed of said rotatable winding to vary the frequency of said secondary winding.

3. The combination with an induction motor having a primary winding and a relatively movable secondary winding, of an alternating current supply circuit for said primary winding, an adjustable transformer connected to said circuit, a second dynamo-electric machine comprising a rotatable armature winding fed from said transformer at a voltage corresponding to the normal secondary winding voltage under any motor load and having a commutator connected to said secondary winding and a stationary field-magnet ring without magnetizing coils, said armature winding being arranged to suppress the multiple frequency armature reaction in the commutating zones, and means for rotating said armature winding under any motor load to produce a frequency in said secondary winding corresponding to the particular normal speed of said secondary winding.

4. The combination with an induction motor having a primary winding and a secondary winding independent thereof, of an alternating current supply circuit, an $n$-phase dynamo-electric machine comprising a field magnet-ring without magnetizing coils and an adjacently disposed winding fed from said supply-circuit and having a commutator cylinder and a plurality of current-collecting zones uniformly spaced around said cylinder, said winding being chorded an amount corresponding to one-half the distance between adjacent current-collecting zones and being connected to said secondary winding with an electrical connection giving $n$ points of current supply per pole of the chorded winding.

5. The combination with a dynamo-electric machine having independent primary and secondary windings, of an alternating current supply circuit, a frequency-changer comprising a rotatable winding having a plurality of collector rings connected to said circuit, said winding having a commutator cylinder, and being chorded to suppress substantially all flux in the commutating zones, and means for varying the speed of said rotatable winding from synchronism to provide alternating current from said commutator cylinder, whereby the operating losses of said frequency-changer vary cyclically and result in a relatively low effective value.

6. The combination with an induction motor having a primary winding and a secondary winding independent thereof, of an alternating current supply-circuit, a second dynamo-electric machine comprising a magnetizable core without magnetizing coils, an adjacently disposed rotatable core provided with a winding, a commutator cylinder therefor having a plurality of equally spaced brush-positions and a plurality of collector rings connected to said circuit and severally having uniformly spaced taps to said winding, and means for driving said wound core at synchronous or different speeds to provide direct or alternating current, respectively, from the commutator, whereby in the latter case, the operating losses of said machine vary in cycles in accordance with the relatively changing positions of said taps and said brush-positions and result in a relatively low average value.

7. The combination with a dynamo-electric machine having a plurality of independent phase-wound windings, of an alternating current supply circuit, a second dynamo-electric machine provided with a rotatable winding fed from said supply circuit and a commutator cylinder for said winding having a plurality of uniformly-spaced current-collecting positions, the coils of said winding severally having a span different from the machine pole pitch by an amount corresponding approximately to one half the distance between adjacent current-collecting positions, and means for connecting said rotatable winding to certain phase-windings of said first machine with $n$ points of current supply per pole of the rotatable winding.

8. In a speed-regulating system for induction motors, the combination with a motor and a supply system therefor, of a frequency-changer of the commutator type interposed between the secondary winding of said motor and said source, said converter comprising means for substantially neutralizing both the main exciting field and the multiple-frequency armature reaction in the commutating zones of said frequency changer, whereby said motor may be rapidly altered in speed without producing excessive sparking in said frequency-changer.

9. In a speed-regulating system for induction motors, the combination with a motor and a supply system therefor, of a frequency-changer of the commutator type interposed between the secondary winding of said motor and said source, said converter comprising means for substantially neutralizing the main exciting field in the commutating zones of said frequency-changer and instantaneously operative to maintain said neutralization upon a change in the frequency-changer load, whereby said motor may be rapidly altered in speed without producing excessive sparking in said frequency-changer.

10. In a speed-regulating system for induction motors, the combination with a motor and a supply system therefor, of a frequency-changer of the commutator type interposed between the secondary winding of said motor and said source, said converter comprising means for substantially neutralizing both the main exciting field and the multiple frequency armature reaction in the commutating zones of said frequency-changer and instantaneously operative to maintain said neutralization upon a change in the frequency-changer load, whereby said motor may be rapidly altered in speed without producing excessive sparking in said frequency-changer.

11. A dynamo-electric machine provided with a plurality of coöperative magnetizable cores and a winding disposed on one of said cores, said winding having N phases and having each coil covering a span of substantially 180 electrical degrees $+ \dfrac{(90°)}{n}$.

12. An $n$-phase electric machine comprising a magnetizable core without magnetizing coils, an adjacently disposed winding having a commutator cylinder with a plurality of current-collecting zones disposed therearound, and current-collecting devices located in said zones, said winding having $n$ phases of current supply per pole and being chorded an amount corresponding to one-half the distance between adjacent current-collecting zones.

13. An alternating-current supply-circuit and an $n$-phase dynamo-electric machine comprising a field-magnet ring without magnetizing coils, an adjacently disposed winding provided with collector-rings connected to said supply-circuit, a commutator cylinder connected to said winding and having a plurality of brush-positions which is an even multiple of the phases of said supply-circuit and uniformly spaced around said cylinder, and current-collecting devices located in said brush-positions, said winding having N-phases of current supply per pole and being chorded an amount corresponding to one-half the distance betwen adjacent brush positions to produce commutating zones of substantially zero intensity in the fluxes set up by the working currents in said winding.

14. A dynamo-electric machine provided with a plurality of coöperative magnetizable cores, a winding disposed on one of said cores, a commutator cylinder therefor having a plurality of current-collecting positions, and brushes in said current-collecting positions, the coils in said winding severally having a span different from the machine pole pitch by an amount corresponding approximately to one-half the distance between adjacent current-collecting positions.

In testimony whereof, I have hereunto subscribed my name this 13th day of Feb. 1914.

BENJ. G. LAMME.

Witnesses:
   F. T. HAGUE,
   B. B. HINES.